Nov. 25, 1958
H. BILLE ET AL
2,862,021
RECOVERY OF PURE DIMETHYL TEREPHTHALATE
BY CONTINUOUS DISTILLATION
Filed April 4, 1957
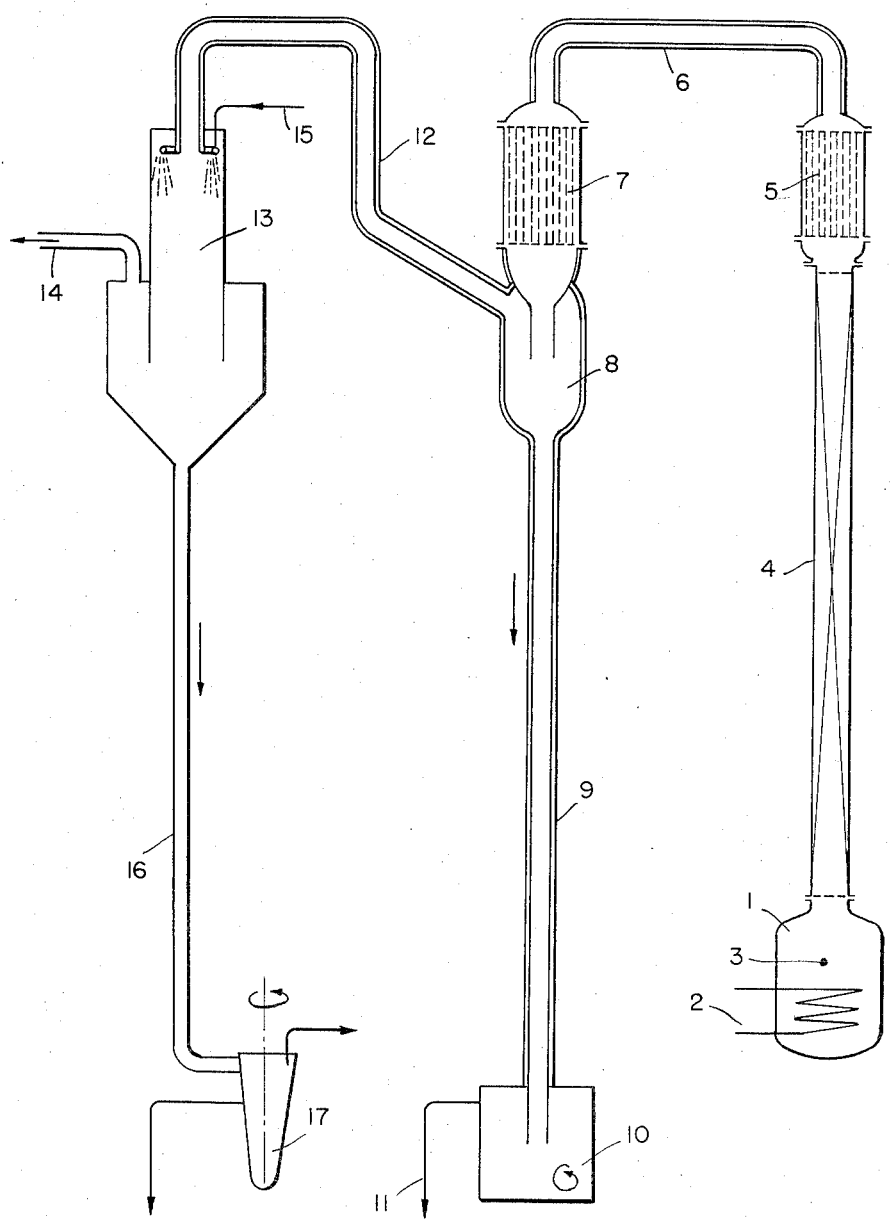
INVENTORS
HEINZ BILLE
HANS SPOHN
HANS-GEORG TRIESCHMANN
BY
ATTORNEYS

United States Patent Office 2,862,021
Patented Nov. 25, 1958

2,862,021

RECOVERY OF PURE DIMETHYL TEREPHTHALATE BY CONTINUOUS DISTILLATION

Heinz Bille, Ludwigshafen (Rhine), Hans Spohn, Frankenthal, and Hans-Georg Trieschmann, Ludwigshafen (Rhine), Germany, assignors to Badische Anilin- & Soda-Fabrik Aktiengesellschaft, Ludwigshafen (Rhine), State of Rhineland (Pfalz), Germany Application April 4, 1957, Serial No. 650,714

Claims priority, application Germany May 17, 1956

2 Claims. (Cl. 260—475)

This invention relates to an improved method for the recovery of pure dimethyl terephthalate by distillation of a crude dimethyl terephthalate under reduced pressure. In particular the improvement consists in avoiding loss of ester during the carrying out of the distillation even on an industrial scale, and providing a safe guarantee that there will be no disturbance of the operation by reason of stoppages in the pipelines even in continuous distillation under reduced pressure on an industrial scale.

It is already known that dimethyl terephthalate can be purified by distillation. The continuous carrying out of the distillation under reduced pressure offers difficulty however because it is practically impossible to maintain completely airtight an apparatus set up for operation on a large scale. Obstruction of the pipe-lines are usually caused by deposition of dimethyl terephthalate at the colder parts of the apparatus, for example behind the condenser in which the vaporous terephthalic acid ester is condensed or in the vacuum aggregate, said terephthalic ester being entrained by the secondary air sucked in and in some cases by the solvent residues, for example methanol and water, escaping in vapor phase from the fused crude ester. The distillation must then not only be discontinued but also quite considerable amounts of dimethyl terephthalate are lost in this way. For example it may be mentioned that with the usual industrial assumption that about 0.1 kilogram of air will be sucked in per hour per metre of the length of the sealing will entrain yet about 0.3 gram of ester corresponding to the partial pressure at an operating vacuum of 40 Torr. after condensation and cooling of the now liquid ester to a few degrees above the solidification point (for example about 150° C.).

We have now found that the distillation of the crude ester under reduced pressure, for example a pressure of 10 to 200 mm. Hg can be carried out continuously without the said disadvantages and loss of ester by condensing the vaporous dimethyl terephthalate in a condenser and cooling it down to a temperature which lies above the melting point of the ester, leading away the liquid ester over the barometric height and solidifying it, stripping the dimethyl terephthalate from the effluent waste gases or liquids by which it is entrained in proportion to the partial pressure of the said gases or liquids prior to their escape over the vacuum aggregate, by the injection of water withdrawing the suspension and separating the ester.

The process will be described in greater detail with reference to the accompanying diagrammatic drawing which shows by way of example one way in which the process may be carried out. Referring to the drawing 1 is the distillation vessel which is filled with crude dimethyl terephthalate, which is heated with steam by internal and/or external heating coils 2 and which is provided with temperature measuring means, for example the thermometer 3. The vaporous dimethyl terephthalate escaping from the still pass through a filler body column 4 and a dephlegmator 5 and through a bridge tube 6 into a condenser 7. The entire length of the tube up to 7 is insulated against heat radiation and is kept by heating at such a temperature that the ester remains in vapor form. In the condenser 7 the ester vapor is condensed and cooled down to a temperature which lies above the melting point of the ester, for example at about 145° to 155° C. The liquid ester flows from the bottom of the condenser, without being further cooled, through a separating vessel 8 and a down pipe 9. The down pipe in which the liquid ester is led down from the barometric height is also heated and kept at a temperature which is above the solidification point but below the boiling temperature of the ester, in order to avoid a crystallization of the ester upon flowing through the barometric height. The conversion of the ester into the crystalline form takes place on cooling rollers 10 where the ester is cooled to the solidification temperature or to a lower temperature and thence the finely crystalline ester passes through pipe 11 into a store container.

The waste gas which leaves the condenser 7 also at a temperature lying above the melting point of the ester passes through a heated tube 12 into an injection condenser 13 and thence through a vacuum aggregate attached to the pipe 14 into the free atmosphere. By injecting cold water, for example water of a temperature, from 0° C. to about 25° C. through pipe 15 into the condenser 13, the dimethyl terephthalate entrained by the waste gases is directly precipitated in solid form and flows down through pipe 16 as a milky, aqueous suspension. The amount of water which is necessary for the complete removal of the ester from the waste gases lies between 1,000 and 2,000 litres for each kilogram of waste gas freed from the ester. The amount of the injected water varies and depends on the strength of the vacuum and on the secondary air sucked in. The amount of water to be sprayed in per hour can readily be ascertained by preliminary test. In general it is sufficient if about 1,000 to 2,000 litres of water are injected per kilogram of secondary air, the latter being capable of calculation by the mentioned known rule from the total length of the sealings of all the flange joints of the still to the point at which the liquefied ester separates from the waste gas. Any vaporous substances also present in the waste gases in addition to the gaseous components, and which are liquid at room temperature, for example methanol or water enclosed in the crude ester, are washed out from the gases by the injected water and run away with the dimethyl terephthalate suspension. The dimethyl ester may be separated from the suspension in the usual way in a vessel 17, for example by filtration or centrifuging. Since this fraction of the ester is also extremely pure it can be mixed, after drying, directly with the ester separated from the cooling rollers, the total yield of pure dimethyl terephthalate thereby being considerably increased.

For example if, in the above-mentioned apparatus, about 150 kilograms of dimethyl ester are distilled per hour at a pressure of 40 Torr. from the still having a capacity of 8 cubic metres with a still temperature of about 190° C., and if the total sealing length of all the flange joints from the still along the filler body column, the dephlegmator, the bridge tube and the condenser 7 up to the point at which the liquefied ester separates from the waste gas in 8, is 15 metres, the following yields are obtained per hour:

Liquid ester withdrawn per hour through the down tube 9 in which the liquid terephthalic acid dimethyl ester passes the barometric height amounts to 150 kilograms; from the waste gases, 4.5 kilograms of dimethyl terephthalate are recovered from the aqueous suspension which arises by injecting 2 cubic metres of cold water from 0° to 25° C. per hour into the injection condenser 13, after separating the solid and drying it.

Even after operation for months at a time, there are no operational disturbances.

On the contrary, if operation is carried out in the same apparatus but with the omission of the injection condenser, i. e. in such a way that the waste gas escapes directly or after passage through other known cooling means, for example through a tube cooler to the vacuum aggregate, the vacuum subsides to such an extent even after 3 to 5 hours that the distillation has to be discontinued because the air which has penetrated through the leaks in the apparatus can no longer be sucked out by reason of constriction of the suction pipe by dimethyl ester which has crystallized out therein.

What we claim is:

1. A process for the recovery of pure dimethyl terephthalate by continuous distillation of the crude ester under a reduced pressure from 10 to 200 mm. Hg which comprises condensing the vaporous dimethyl terephthalate by cooling to a temperature which lies above the melting point of the ester, separating the liquid ester from the waste gases containing the ester in an amount corresponding to its partial pressure, withdrawing the liquid ester and solidifying it by further cooling, while the waste gases, before they are allowed to escape by expanding in the atmosphere are freed from the dimethyl terephthalate by injecting water of a temperature between about 0° and about 25° C. withdrawing the resultant aqueous suspension of the precipitated ester and separating the ester from the suspension in usual manner by filtration.

2. The process as claimed in claim 1, wherein 1,000 to 2,000 litres of water are injected in the waste gases for each kilogram waste gas freed from the ester.

References Cited in the file of this patent

UNITED STATES PATENTS

| | | |
|---|---|---|
| 2,614,128 | Mertzweiller | Oct. 14, 1952 |
| 2,646,393 | Hughes et al. | July 21, 1953 |
| 2,653,165 | Levine | Sept. 22, 1953 |